(No Model.)
M. F. POSTLEY.
PINEAPPLE KNIFE.
No. 555,398. Patented Feb. 25, 1896.
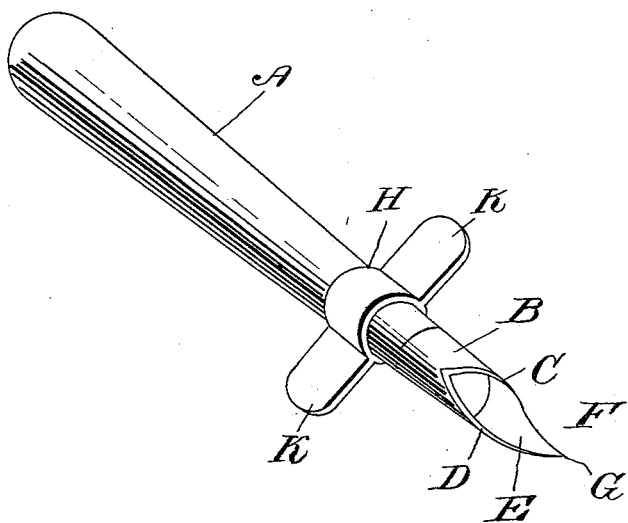
WITNESSES:
M. B. Harris
C. Gerst
INVENTOR
Mary F. Postley
BY
Edgar Tate & Co
ATTORNEYS

UNITED STATES PATENT OFFICE.

MARY F. POSTLEY, OF NEW YORK, N. Y.

PINEAPPLE-KNIFE.

SPECIFICATION forming part of Letters Patent No. 555,398, dated February 25, 1896.

Application filed September 7, 1895. Serial No. 561,787. (No model.)

*To all whom it may concern:*

Be it known that I, MARY F. POSTLEY, a citizen of the United States, and a resident of New York, in the county of New York and State of New York, have invented certain new and useful Improvements in Pineapple-Knives, of which the following is a specification, reference being had to the accompanying drawing, forming a part thereof, in which similar letters of reference indicate corresponding parts.

This invention relates to pineapple-knives, and knives for cleaning and paring fruits and other vegetables, and the object thereof is to provide an effective device of this class by means of which the ends of a pineapple may be removed, and also the hull thereof, before the latter becomes thoroughly dried, and by means of which apples and other fruits and potatoes and other vegetables may be cleaned and specks or decayed spots removed therefrom, said device being simple in construction and operation and comparatively inexpensive.

The invention is fully disclosed in the following specification, of which the accompanying drawing forms a part, which represents a perspective view of my improved device.

In the practice of my invention I provide a handle A, which may be of any desired form, but which is preferably of the form shown in the drawing, and secured to or formed on the end of the handle A is an attachment B, the end of which is preferably tubular in form and adapted to be secure to the handle in any desired manner, if formed separately therefrom, and the sides of the outer end of which are cut away as shown in the drawing, one side being cut away in the form of a double or ogee curve, as shown at C, and the outer side being cut away on a single curve, as shown at D, whereby is formed a blade E, provided with a curved cutting-edge, as F, and a curved sharpened point G. I also preferably mount upon or connect with the handle A, near the attachment B, a fender or guard H, consisting of a tubular central portion through which the handle is adapted to be passed, said tubular central portion being provided with projecting side flanges or wings K.

The operation will be readily understood from the foregoing description when taken in connection with the accompanying drawing. The attachment B, provided with the curved cutting-edge F, constitutes an effective device for preparing pineapples for use as hereinbefore described, and also for paring, peeling, or otherwise preparing fruits or vegetables, while the curved projecting point G, which is also provided with a cutting-edge, constitutes a simple and effective device for removing specks, decayed spots or other defects from such fruit or vegetables.

It will thus be seen that I accomplish the object of my invention by means of a device which is simple in construction and operation and one well adapted to produce the result for which it is intended.

My invention is not limited to the exact form, construction and arrangement of parts shown and described, and I therefore reserve the right to make all such alterations therein and modifications thereof as fairly come within the scope of the invention.

Having fully described my invention, I claim and desire to secure by Letters Patent—

As a new article of manufacture a pineapple-knife, as herein shown, consisting of the tapering handle A, a tubular attachment B, one side of the outer end of which is cut away in the form of a double ogee curve, the outer side being cut away on a single curve; whereby a blade is formed provided with a curved cutting-edge, and a laterally-curved sharpened point, and a guard or fender with a tubular central portion adapted to be secured upon the handle A, and projecting side flanges or wings, substantially as described.

In testimony that I claim the foregoing as my invention I have signed my name, in presence of the subscribing witnesses, this 6th day of September, 1895.

MARY F. POSTLEY.

Witnesses:
C. GERST,
M. A. KNOWLES.